United States Patent [19]
Puttman

[11] Patent Number: 5,895,176
[45] Date of Patent: Apr. 20, 1999

[54] DEVICE FOR CONNECTING A PIPELINE CONDUIT TO A GROUND-BORING MACHINE

[75] Inventor: Franz-Josef Puttman, Lennestadt, Germany

[73] Assignee: Tracto-Technik Paul Schmidt Spezialmaschinen, Lennestadt, Germany

[21] Appl. No.: 08/807,015

[22] Filed: Feb. 26, 1997

[30] Foreign Application Priority Data

Mar. 2, 1996 [DE] Germany ............ 196 08 056

[51] Int. Cl.⁶ .......................... E02F 5/10; F16L 55/18
[52] U.S. Cl. ............ 405/184; 405/154; 175/53; 138/97
[58] Field of Search ............ 405/154, 156, 405/184; 175/53, 171, 202; 138/97, 98; 254/134.3, 385, 386; 173/32, 91, 147

[56] References Cited

U.S. PATENT DOCUMENTS

| 2,074,003 | 3/1937 | Templeton et al. | 405/184 X |
| 4,060,992 | 12/1977 | Hietkamp et al. | 405/174 X |
| 4,100,972 | 7/1978 | Schmidt . | |
| 4,602,495 | 7/1986 | Yarnell | 138/97 X |
| 4,732,222 | 3/1988 | Schmidt | 175/22 |
| 4,747,579 | 5/1988 | Rich | 254/386 |
| 5,173,009 | 12/1992 | Moriarty | 138/97 X |
| 5,240,352 | 8/1993 | Homaki | 405/184 |

FOREIGN PATENT DOCUMENTS

| 190933 | 8/1986 | European Pat. Off. . | |
| 0 694 675 | 1/1996 | European Pat. Off. . | |
| 3801472 | 8/1989 | Germany | 138/97 |
| 2 291 690 | 1/1996 | United Kingdom . | |
| WO 87/03353 | 6/1987 | WIPO . | |

*Primary Examiner*—David J. Bagnell
*Assistant Examiner*—Jong-Suk Lee

[57] ABSTRACT

A device for connecting a pipeline conduit to a ground-boring machine or for replacing old pipes and inserting the end of an individual pipe into a sleeve joint of the preceding pipeline conduit, comprising a tensioning frame that can be attached to the end of the pipeline conduit or the individual pipe to be connected thereto, a tensioning drive on the tensioning frame, and a cable or chain that is coupled to the machine as well as the tensioning drive.

9 Claims, 3 Drawing Sheets

DEVICE FOR CONNECTING A PIPELINE CONDUIT TO A GROUND-BORING MACHINE

FIELD OF THE INVENTION

The invention pertains to a device for connecting a pipeline conduit to a ground-boring machine or for replacing old pipes and inserting the end of an individual pipe into a sleeve joint of the preceding pipeline conduit.

BACKGROUND OF THE INVENTION

Machines for producing ground bores or for replacing old pipes may consist of pneumatically driven ram-boring machines that draw a pipeline conduit into the ground bore produced by the machine. The machine may simultaneously shatter an existing old pipe with its tip. In this case, the machine follows the progression of the old pipe and draws the new pipeline conduit into the thusly formed free ground bore.

The new pipeline conduit drawn into the ground bore is subjected to dynamic forces caused by the machine as well as the frictional forces in the ground bore. Consequently, a solid, shock-resistant connection between the ground-boring machine and the pipeline conduit must be ensured.

If the pipeline conduit is drawn in from a channel shaft, the pipeline conduit must consist of individual pipes, the length of which is smaller than the diameter or the internal dimension of the channel shaft such that the individual pipes can be axially attached to the end of the pipeline conduit when the pipe is drawn from the shaft into the ground bore.

If the pipeline conduit is a pressure water conduit, the individual pipes can be connected to one another by means of threads that are able to withstand relatively high axial forces. However, it is quite problematic to ensure a secure connection to the ground-boring machine because the aforementioned shocks and vibrations occur in this case. The threads are not able to withstand these shocks and vibrations as well as the high axial forces due to the continuous stress concentration.

When drawing in waste water pipes, in which the sleeve joint is realized in self-sealing fashion or tight ring seals are used for sealing the sleeve, particularly high joining forces are required for connecting two individual pipes. Despite this requirement, pipeline connections of this type are usually not resistant to tension under the influence of the vibrations produced by the ram-boring machine. Consequently, it is necessary to draw in these pipes via traction means (e.g., a chain or cable).

SUMMARY OF THE INVENTION

The present invention is based on the objective of developing a device for connecting a pipeline conduit to a ground-boring machine or for replacing old pipes and drawing the end of an individual pipe into a sleeve connection of the preceding pipeline conduit which is easy to handle, able to generate high forces, and can withstand the dynamic forces caused by the ground-boring machine as well as the frictional forces acting upon the pipeline conduit in the bore.

According to the invention, this objective is attained with a tensioning frame that can be attached to the end of the pipeline conduit or an individual pipe to be connected thereto, a tensioning drive on the tensioning frame, and a cable or chain that is coupled to the machine as well as the tensioning drive.

The tensioning drive engages on the cable or chain such that the tensioning frame attached to the end of the pipeline conduit or the individual pipe to be connected thereto exerts a compressive force upon the pipeline conduit and the individual pipe to be connected thereto, i.e., this compressive force pushes the pipeline conduit and the individual pipe together up to the limit stop. Due to this measure, it is possible to produce a sleeve connection between the end of the pipeline conduit and an individual pipe as well as a tight connection to the ground-boring machine. In this case, the shocks caused by the machine and the frictional forces acting upon the pipeline conduit in the ground bore are absorbed by the cable or chain while the compressive force generated by the tensioning drive acts upon the pipeline conduit.

The tensioning drive may consist of a rotationally driven winch, preferably a gypsy winch. However, the tensioning drive may also be realized in the form of a linear drive with at least one holding device for the cable or chain. Since the linear drive is connected to the tensioning frame as well as the ground-boring machine via the holding device for the cable or chain, the actuation of the linear drive causes the cable or chain to be tightened such that the pipeline conduit and the individual pipe to be connected thereto are pushed together.

In order to allow the multiple actuation of the linear drive if the pipeline conduit and the cable or chain are very long, a stationary holding device may be arranged on the tensioning frame, and a movable holding device may be arranged on the linear drive. The cable or chain can be incrementally tightened until the desired tension is reached by alternately actuating the linear drive and the two holding devices.

If the cable or chain is guided over a deflection roller on the linear drive and one respective holding device is arranged in front and behind the pulley, the tensioning length of the cable or chain referred to the travel of the linear drive can be doubled, i.e., the device can be realized in space-saving fashion.

The holding device on the linear drive in front of the deflection roller may consist of a cable pulley or chain wheel with a reverse rotation lock that can be released such that the linear drive may be arranged perpendicular to the advance direction and requires particularly little space in the advance direction. In this case, the linear drive may consist of at least one hydraulic piston/cylinder unit that is arranged on the tensioning frame perpendicular to the advance direction, with the cable pulley or chain wheel with the reverse rotation lock being realized in the form of a deflection roller on the tensioning frame and arranged within the region in which the tensioning frame contacts the pipe end.

In this case, the reverse rotation lock on the cable pulley or chain wheel may be realized in the form of a ratchet lock that preferably comprises a ratchet that can be decoupled so as to compensate the prestress of the cable or chain. If the chain is realized in the form of a round link chain, the chain wheel with the reverse rotation lock may be formed by a sprocket wheel that guides the round link chain without slipping. When using a round link chain, the holding device on the tensioning frame may be realized in the form of an oblique jib with a slot that is open on one side in order to secure one chain link.

A particularly compact design that still generates high tensile forces can be attained if two parallel hydraulic piston/cylinder units are fastened to both sides of the tensioning frame and the chain wheel with the reverse rotation lock arranged in between. In this case, the linearly movable parts of the piston/cylinder units are guided on the tensioning frame in guides and connected by means of a lateral shaft, on which the deflection roller is arranged.

BRIEF DESCRIPTION OF THE DRAWINGS

The invention is described in detail below with reference to one embodiment that is illustrated in the figures. The figures show.

DETAILED DESCRIPTION OF PREFERRED EMBODIMENTS

Figure 1:
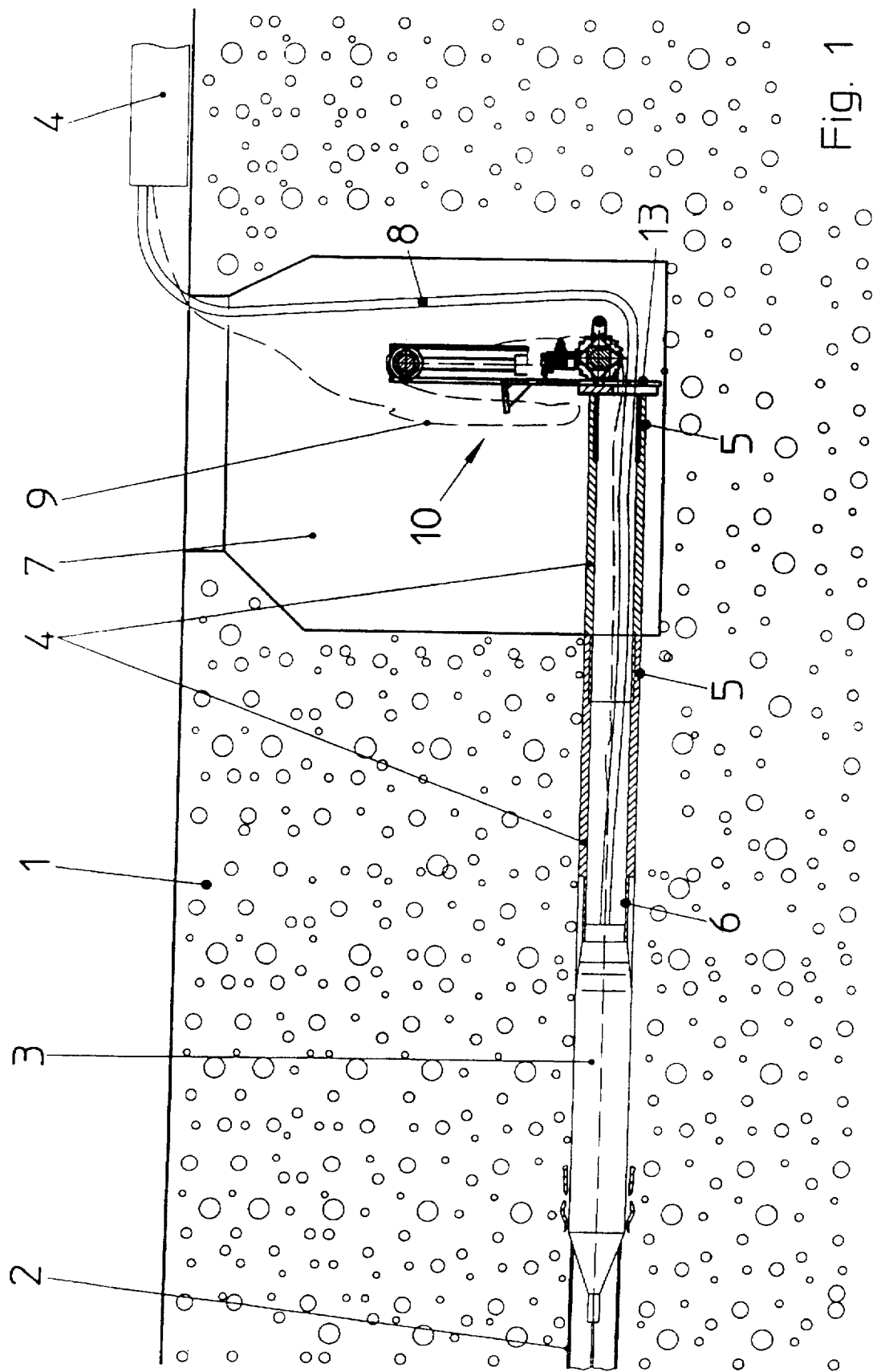
FIG. 1: a partially sectioned, schematic representation of a pipeline conduit that is drawn into the ground from a channel shaft by means of a ram-boring machine.

FIG. 1 shows an old pipe 2 that is shattered by means of a pneumatically driven ram-boring machine 3 and extends in the ground 1. The ram-boring machine 3 pulls a pipeline conduit 5 that is composed of individual pipes 4. Each individual pipe comprises a sleeve 5 on one end and a tapered end 6 that engages into the sleeve 5 of the preceding pipe 4.

The ram-boring machine 3 is inserted into the old pipe 2 from the channel shaft 7, with the required energy for the ramboring machine 3 being supplied via a compressed air hose 8 that extends through the pipeline conduit formed by the individual pipes 4.

In order to rigidly connect the pipeline conduit consisting of the individual pipes 4 to additional pipes 4 as well as the ram-boring machine 3, a chain 9 that is guided through an opening 13 in a base plate/tensioning frame 11, a pipeline conduit connecting device is fastened to the ram-boring machine.

The pipeline conduit connecting device 10 can be attached to the end of the last individual pipe 4 by means of an exchangeable adapter 12 that is adapted to the pipe diameter. The compressed air hose 8 and the chain 9 extend toward the outside through the slot-like opening 13 such that the tensioning unit can be removed from the region between the pipeline conduit that has already been drawn in and the pipeline conduit that still must be drawn in so as to introduce an additional pipe to be drawn in. A chain wheel 14 that is realized in the form of a sprocket wheel is arranged in rotatable fashion on the base plate within the region of the opening 13. This sprocket wheel comprises a reverse rotation lock in the form of a toothed locking wheel 15 and a ratchet mechanism 16 that cooperates with said locking wheel. The ratchet mechanism 16 can be locked by means of a hand lever 17. One respective hydraulic piston/cylinder unit 18 is arranged to both sides of the chain wheel 14 and fastened to the base plate 11 with one end. A lateral shaft 20 is fastened to the ends of the piston rods 19. This lateral shaft carries rollers 21 that are guided in guides 22 on the base plate 11 as well as a deflection roller 23 in its center.

Return springs 24 that return the piston rods 19 into the retracted position when the hydraulic piston/cylinder units 18 are not pressurized are arranged parallel to the hydraulic piston/cylinder units 18 on the shaft and on the base plate 11. Naturally, this return motion may also be realized by means of double-action piston/cylinder units. It would also be conceivable to utilize only one hydraulic piston/cylinder unit instead of a hydraulic piston/cylinder pair, with the chain wheel 14 being situated underneath the cylinder and the deflection roller being situated above the cylinder in this case.

Figure 3:
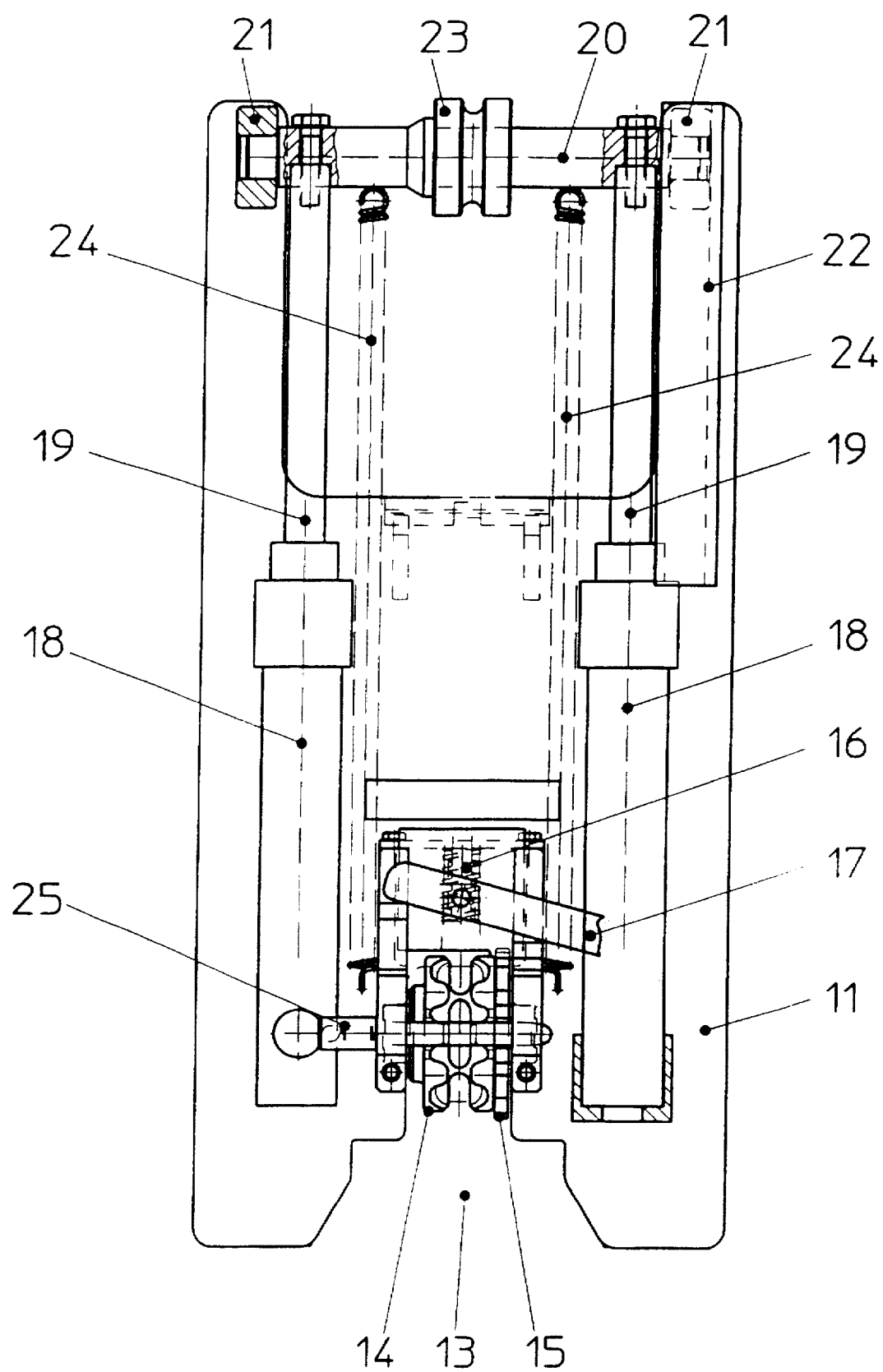
FIG. 3: a side view of the device according to the invention with two tensioning cylinders.

A removable bolt 25 that prevents the chain 9 from unintentionally falling out of the chain wheel 14, in particular, when the tension is increased, extends laterally above the chain wheel 14 in FIG. 3. In addition, a holding device in the form of a jib 26 with a slot 27 is arranged on the base plate 11. Consequently, the device according to the invention functions as follows:

It is assumed that an individual pipe 4 was drawn into the ground bore while the old pipe 2 was simultaneously shattered by means of the ram-boring machine 3, namely to such an extent that the sleeve 5 situated on the end of the pipe ends flush with the wall of the channel shaft 7. The pipeline conduit connecting device 10 is removed from this individual pipe 4 such that the rear end of said pipe with the sleeve 5 is exposed. An individual pipe 4 stored on the surface can now be advanced via the fluid hose 8 and the chain 9 until the tapered end 6 of this individual pipe can be attached to the sleeve 5 in the channel shaft 7. Subsequently, the adapter 12 is placed into the sleeve 5 of the individual pipe 4 to be attached, and the chain 9 is placed over the sprocket wheel 14 as well as the deflection roller 23 and manually tightened such that one chain link can be secured in the slot 27 on the jib 26.

This manual tightening of the chain 9 is carried out while the piston rods 19 are retracted into the hydraulic piston/cylinder units 18. If the hydraulic piston/cylinder units 18 are now charged with compressed oil, the chain is tightened while rolling over the chain wheel 14 and the deflection roller 23.

Figure 2:
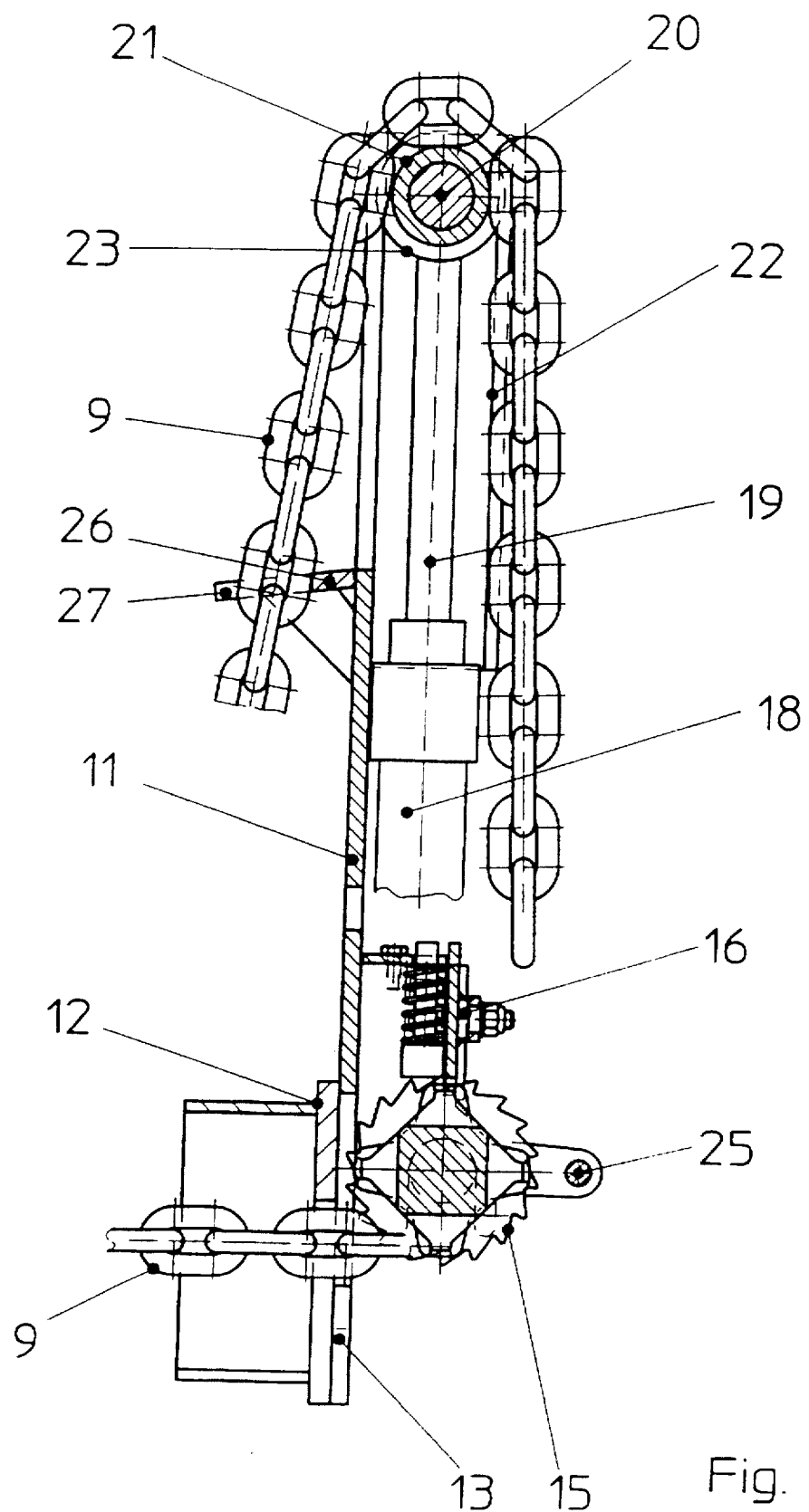
FIG. 2: a partially sectioned side view of the device according to the invention.

If the chain tension does not suffice after the full stroke shown in FIGS. 2 and 3 is reached or the tapered end 6 of the individual pipe 4 is not completely drawn into the sleeve 5, the deflection roller 23 with the piston rods 19 can be returned into the retracted position under the influence of the return springs 24 without reducing the chain tension within the installed pipeline conduit. This is attained due to the fact that the sprocket wheel 14 is prevented from carrying out a reverse rotation by the ratchet mechanism 16 that engages into the toothed locking wheel 15. The part of the chain situated between the sprocket wheel 14 and the holding device 26,27 is loosened, but can be tightened by securing another chain link in the holding device 26,27. Subsequently, the hydraulic piston/cylinder units 18 are subjected to pressure again so as to move the deflection roller 23 into the position shown in FIGS. 2 and 3 and tighten the chain anew.

This procedure can be repeated until all sleeve connections of the individual pipes 4 are completely pushed into one another and a connection to the ram-boring machine 3 is produced with a predetermined prestress.

The ram-boring machine 3 is now actuated again until the preceding pipe 4 that still protrudes into the channel shaft 7 is advanced to such an extent that it ends approximately flush with the channel wall. Subsequently, the attachment of an additional pipe 4 is repeated in the previously described fashion.

If the prestress of the chain 9 must be eliminated so as to remove the pipeline conduit connecting device 10 from the last individual pipe 4, it is merely necessary to unlock the ratchet mechanism 16 by means of the hand lever 17 such that the sprocket wheel 14 is able to turn in the opposite direction while the linear tensioning unit is retracted. This causes a corresponding length of the chain 9 to be released.

Instead of using a linear drive in the form of hydraulic piston/cylinder units 18, it would also be conceivable to employ a rotary drive for the sprocket wheel 14, e.g., a hydraulic motor that allows a gradual tightening of the chain 9 without interruptions.

The hydraulic piston/cylinder units may also be replaced with a threaded spindle drive, the spindle of which is either turned manually by means of a ratchet or automatically with the aid of a driving motor. In any case, it is decisive that the tensioning frame is arranged perpendicular to the advance direction.

In addition, it is possible to utilize a steel cable instead of a chain 9. However, holding devices in the form of cable clamps are required in this case.

If the rotationally driven winch is formed by a gypsy winch, it is possible to subject the cable to a high tensile stress if the free end of the cable is looped around the capstan several times and pulled with a relatively low tensile force.

I claim:

1. A device for connecting a pipeline conduit to a ground-boring machine and inserting an end of an individual pipe into a sleeve of a preceding pipeline conduit, comprising:
 a vertical tensioning frame,
 a tensioning drive on the tensioning frame, and
 a cable or chain that is coupled to the ground-boring machine as well as the tensioning drive.

2. The device according to claim 1, wherein the tensioning drive is a linear drive including at least one holding device for the cable or chain.

3. The device according to claim 2, further including a stationary holding device on the tensioning frame and a movable holding device on the linear drive.

4. The device according to claim 2, wherein the cable or chain is guided over a first deflection roller on the linear drive, and wherein first and second holding devices are arranged in front of and behind the first deflection roller, respectively.

5. The device according to claim 4, wherein the first holding device on the linear drive in front of the first deflection roller consists of a cable pulley or chain wheel with a reverse rotation lock that can be released.

6. The device according to claim 5, wherein the linear drive consists of at least one hydraulic piston/cylinder unit that is arranged on the tensioning frame perpendicular to the advance direction, and wherein the cable pulley or chain wheel with the reverse rotation lock on the linear drive forms a second deflection roller and is arranged within a region in which the tensioning frame contacts the pipe end.

7. Device according to claim 6, wherein two parallel hydraulic piston/cylinder units are fastened to the tensioning frame, wherein the chain wheel with the reverse rotation lock is arranged between the two hydraulic piston/cylinder units, and wherein linearly movable parts of the piston/cylinder units are guided on the tensioning frame in guides and connected by means of a shaft, on which the first deflection roller is arranged.

8. The device according to claim 5, wherein the reverse rotation lock includes a ratchet lock.

9. Device according to claim 5, wherein the chain is a round link chain, wherein the chain wheel with the reverse rotation lock is a sprocket wheel, and wherein the second holding device on the tensioning frame is an oblique jib with a slot that is open on one side so as to secure one chain link.

* * * * *